United States Patent
Subramanian et al.

(10) Patent No.: US 8,591,398 B2
(45) Date of Patent: Nov. 26, 2013

(54) TELESCOPIC TILTING DEVICE

(75) Inventors: Arunkumar Subramanian, Hong Kong (CN); Kabilan Santhanam, Shenzhen (CN); Ning Tang, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 13/478,734

(22) Filed: May 23, 2012

(65) Prior Publication Data

US 2012/0227531 A1   Sep. 13, 2012

Related U.S. Application Data

(62) Division of application No. 12/412,774, filed on Mar. 27, 2009, now Pat. No. 8,414,470.

(30) Foreign Application Priority Data

Mar. 28, 2008 (CN) .............................. 200810096370

(51) Int. Cl.
*A61B 1/00* (2006.01)
(52) U.S. Cl.
USPC ........................................................ 600/102
(58) Field of Classification Search
USPC ........ 74/89.18, 89.2–89.22, 490.01; 600/102; 254/265, 266; 606/130
See application file for complete search history.

(56) References Cited

U.S. PATENT DOCUMENTS

| | | | |
|---|---|---|---|
| 4,295,624 | A | 10/1981 | Granada |
| 4,541,293 | A | 9/1985 | Caugant et al. |
| 4,545,723 | A | 10/1985 | Clark |
| 4,562,750 | A | 1/1986 | Arai |
| 4,629,214 | A | 12/1986 | Foehl |
| 4,642,941 | A | 2/1987 | Staran et al. |
| 5,109,718 | A | 5/1992 | Gugel et al. |
| 5,193,528 | A | 3/1993 | Iwamoto et al. |
| 5,695,271 | A | 12/1997 | Zeller |
| 5,820,623 | A | 10/1998 | Ng |
| 2004/0172883 | A1 | 9/2004 | Rogers et al. |

FOREIGN PATENT DOCUMENTS

| | | |
|---|---|---|
| GB | 657777 | 9/1951 |
| JP | H09201329 | 8/1997 |
| JP | 2008017903 | 1/2008 |
| WO | WO 2007/029202 A2 | 3/2007 |

*Primary Examiner* — Justin Krause
(74) *Attorney, Agent, or Firm* — Muncy, Geissler, Olds & Lowe, PLLC

(57) ABSTRACT

A telescopic tilting device 12 comprises a telescopic arm 14 which is extendable and retractable along an arcuate path 16. Preferably, the telescopic arm 14 includes two arcuate members 22, 24 which are telescopically slidable relative to each other. More preferably, the device further comprises a drive unit 20 having a flexible belt 43 for moving the telescopic arm 14. There is also provided an endoscope holding device 10 which has such a telescopic tilting device 12.

15 Claims, 4 Drawing Sheets

US 8,591,398 B2

TELESCOPIC TILTING DEVICE

CROSS REFERENCE TO RELATED APPLICATIONS

This application is a divisional of application Ser. No. 12/412,774, filed on Mar. 27, 2009 U.S. Pat. No. 8,414,470, for which priority is claimed under 35 U.S.C. §120; and this application claims priority of Application No. CN200810096370.4 filed in The People's Republic of China on Mar. 28, 2008 under 35 U.S.C. §119, the entire contents of all of which are hereby incorporated by reference.

FIELD OF THE INVENTION

The present invention relates to a telescopic tilting device and more particularly, but not exclusively, to an endoscope holding device having such a titling device.

BACKGROUND OF THE INVENTION

Endoscopes are well know optical devices used primarily in the medical field for endoscopy. However, uses in many other fields are common. The planning and architectural communities have found the endoscope useful for pre-visualization of scale models of proposed buildings and cities, commonly referred to as architectural endoscopy. The internal inspection of complex technical systems makes use of endoscopy, and such as device is commonly referred to as a borescope. Endoscopes are also a helpful tool in the examination of improvised explosive devices by bomb disposal personnel; and the law enforcement and intelligence agencies use endoscopes for conducting surveillance via tight or restricted spaces.

An endoscope is a slender, tubular optical instrument used as a viewing system for examining an inner part of an item, such as the body, and, with an attached instrument, typically for minimally invasive biopsy or surgery.

However, an endoscope invariably has an elongate flexible arm of fixed length which is fed into the patient or area to be examined. The operator of the endoscope has to use both hands substantially continuously in order to locate and control the endoscope. If the endoscope is released, the image moves. It thus becomes necessary to have two people, one to hold and operate the endoscope, and the other to perform whatever function is required, such as surgery.

It is also problematic for a person to hold the endoscope at a particular position or angle for an extended period of time. This is especially so when the most appropriate viewing angle is at a position which is directly over the patient or item being viewed.

SUMMARY OF THE INVENTION

The present invention therefore seeks to provide a telescopic titling device which is particularly, but not exclusively, suitable for use as part of an endoscope holding device in order to alleviate the above-mentioned problems.

According to a first aspect of the invention, there is provided a telescopic tilting device comprising a telescopic arm which is extendable and retractable along an arcuate path, the telescopic arm includes two rigid arcuate members which are telescopically slidable relative to each other, wherein the tilting device is rotatable about an axis of rotation R, so that the telescopic arm is movable transversely.

Advantageously, the device may further comprise a housing into and out of which the telescopic arm is telescopically movable.

Furthermore, the device may further comprise a drive unit having a flexible belt for moving the telescopic arm. In this case, the drive unit may include a motor for driving the flexible belt, a driving torque supplied by the motor being provided to the flexible belt via a clutch, the clutch having a slip mechanism which prevents the transmission of torque through the clutch if a predetermined torque is exceeded.

Furthermore, the device may include a guide element which prevents folding of the flexible belt.

The distal end of the telescopic arm may be movable through at least 100 degrees.

Preferably, the arcuate members are curved in only one plane such that the arcuate path lies in a single plane and the axis of rotation R extends in parallel with the plane in which the arcuate path lies.

Preferably, the device further comprises a rectilinear member which is movable along a rectilinear path independently of the telescopic arm.

More preferably, the rectilinear path of the rectilinear member extends in parallel with a plane in which the arcuate path of the telescopic arm lies.

Preferably, the arcuate path, when projected into a parallel plane to the axis of rotation, is described about an intersection point I which lies on the axis of rotation.

Preferably, the intersection point I is stationary during movement of the telescopic arm.

Preferably, a carriage for holding a rectilinear member and which is movable to move the rectilinear member along a rectilinear path independently of the telescopic arm.

Preferably, the rectilinear path P of the rectilinear member extends in a plane containing the axis of rotation and in parallel with a plane in which the arcuate path of the telescopic arm lies and intersects the axis of rotation R at the intersection point I.

Preferably, the carriage is part of a zoom unit provided at one end of the telescopic arm.

Preferably, the zoom unit is removably attached to the telescopic arm.

Additionally, a controller wiring harness may be provided on the telescopic arm, having a releasable push-fit electrical connector to which a drive motor for driving the carriage is electrically connected.

According to a second aspect of the invention, there is provided an endoscope holding device comprising a telescopic tilting device in accordance with the first aspect of the invention.

BRIEF DESCRIPTION OF THE DRAWINGS

A preferred embodiment of the invention will now be described, by way of example only, with reference to the accompanying drawings, in which.

Figure 1:
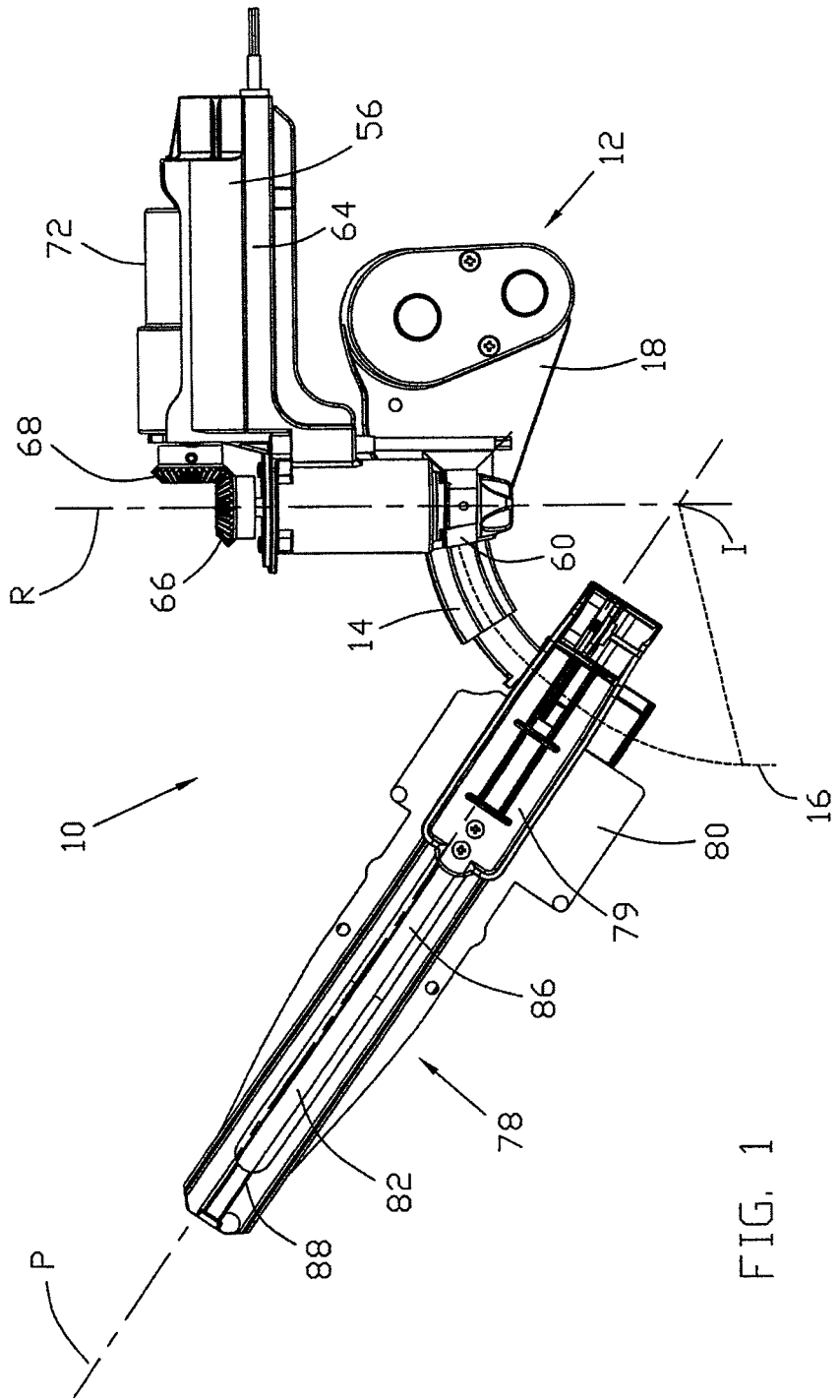
FIG. 1 shows a side view of an endoscope holding device having one embodiment of a telescopic tilting device, in accordance with the present invention.
Figure 2:
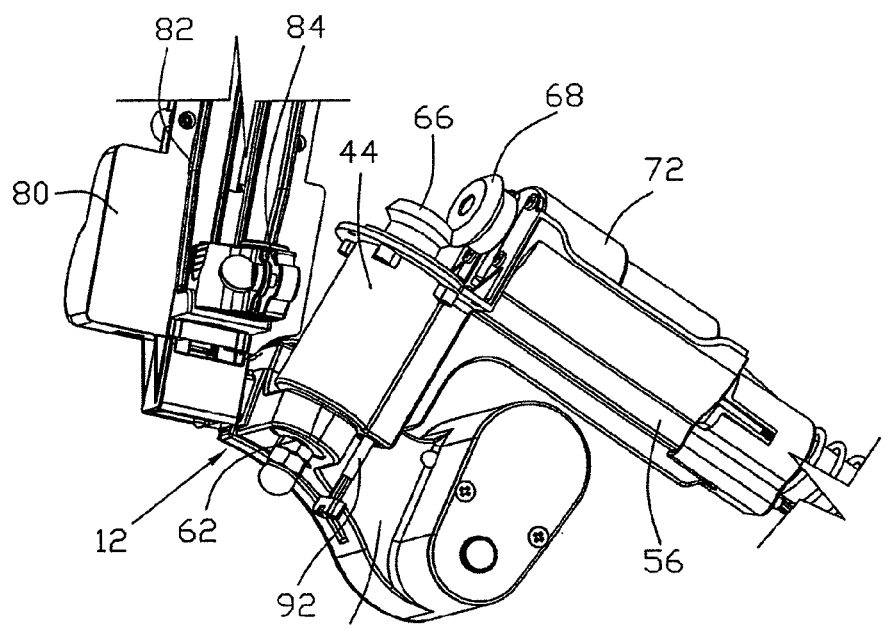
FIG. 2 is an enlarged view of part of the tilting device shown in FIG. 1.
Figure 3:
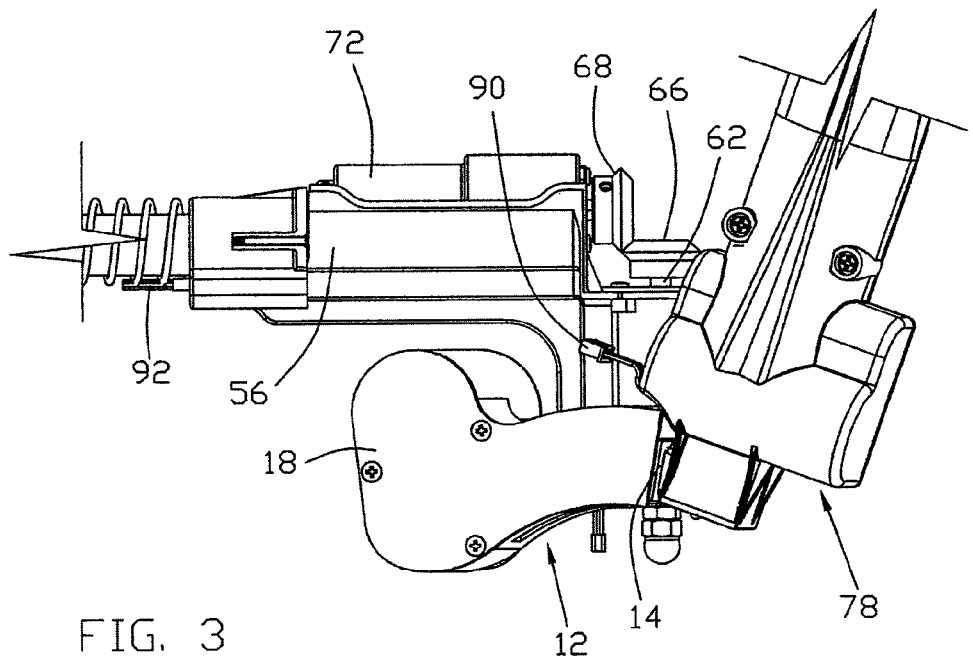
FIG. 3 is an enlarged view from the other side of FIG. 2.
Figure 4:
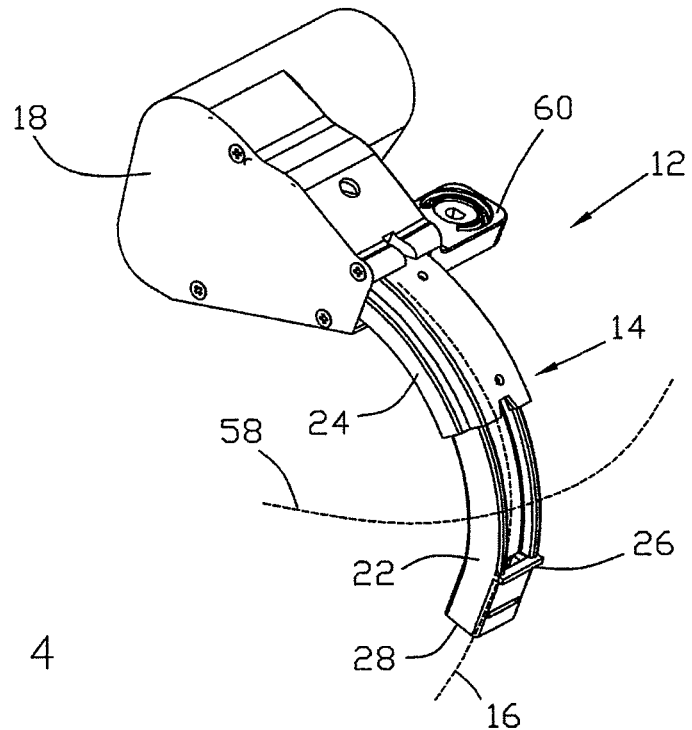
FIG. 4 is a perspective view of the telescopic tilting device, removed from the endoscope holding device and with its arcuate telescopic arm extended.

In the figures, identical structures, elements or parts that appear in more than one figure are generally labeled with a same reference numeral in all the figures in which they appear. Dimensions of components and features shown in the figures are generally chosen for clarity of presentation and are not necessarily shown to scale.

DETAILED DESCRIPTION OF THE PREFERRED EMBODIMENTS

Referring to the drawings, there is shown an endoscope holding device 10 which comprises a telescopic tilting device 12 having a telescopic arm 14 which is extendable and retractable along an arcuate path 16.

The telescopic arm 12 comprises a housing 18 in which a drive unit 20 is located, and two arcuate elongate arm members 22, 24 which, by the drive unit 20, are telescopically slidable relative to each other and which are retractable into and extendable out of the housing 18. Each arm member 22, 24 is curved in only one plane, and thus the arcuate path 16 along which the telescopic arm 14 extends and retracts lies in only a single plane.

Each arm member 22, 24 is rigid and not flexible, and has a broadly or generally U-shaped lateral cross-section along its longitudinal extent. The lateral cross-sectional dimensions of the inner arm member 22 are smaller than those of the outer arm member 24 to enable the inner arm member 22 to slide within the outer arm member 24. Thus, the arm members 22 and 24 define elongate channels. In this embodiment, the inner arm member 22 is nested within the outer arm member 24, so that the open longitudinal side faces the bottom of the channel of the outer arm member 24.

Although generally U-shaped, the lateral cross-sections of the two arm members 22, 24 can be any circular or non-circular shape, such as square, rectangular and box-section.

The inner arm member 22 includes a stop 26 at or adjacent to its distal end 28 to prevent it from being fully retracted into the outer arm member 24.

Figure 5:
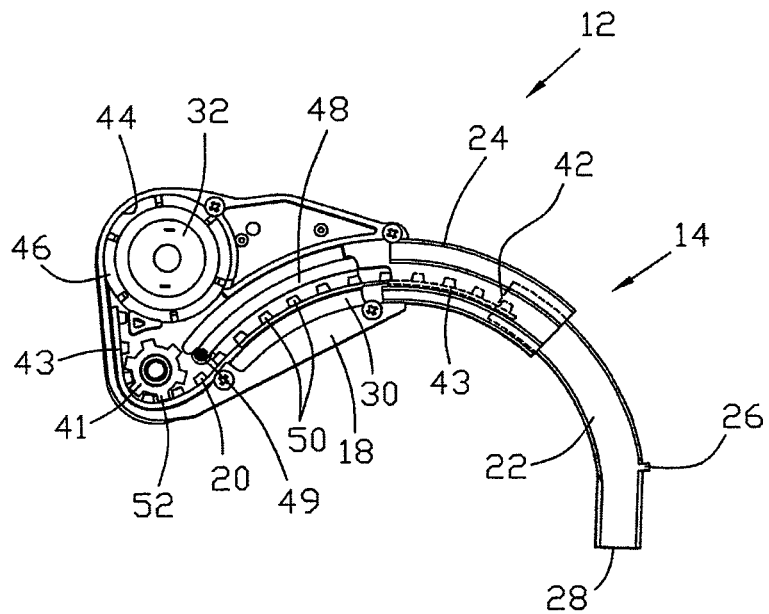
FIG. 5 is a side view showing the telescopic titling device of FIG. 4, with a side cover removed.
Figure 6:
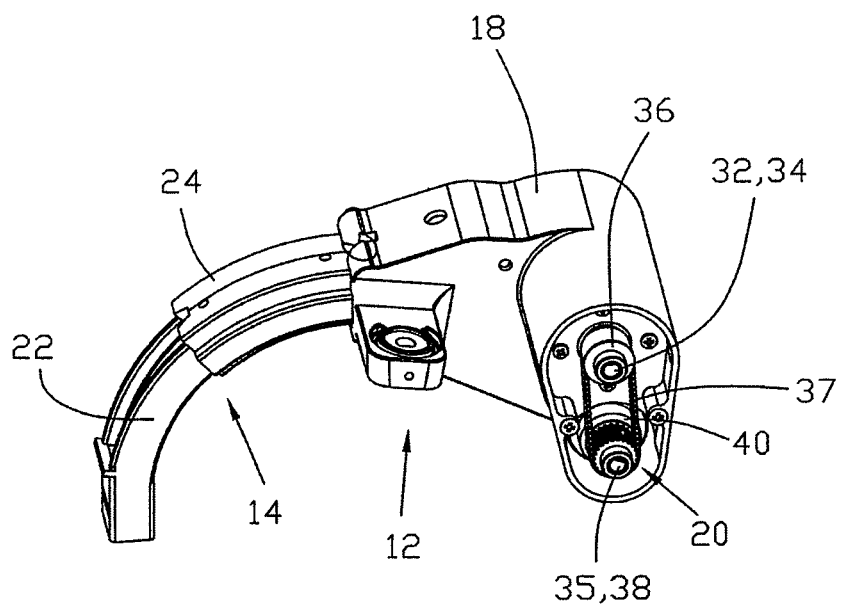
FIG. 6 is a view of the telescopic tilting device as shown in FIG. 4, but from the other side and with another side cover removed.

A channel 30 having an arcuate longitudinal extent is defined within the housing 18 to accommodate substantially the entire longitudinal extent of the outer arm member 24, as can be seen in FIG. 5.

The drive unit 20 includes an electric motor 32 which is mounted in the housing 18 adjacent to one end of and above the channel 30. An output shaft 34 of the motor 32 drives an intermediate shaft 35 via a toothed primary cog 36 on the output shaft 34, a belt drive 37, and a secondary cog 38 on the intermediate shaft 35. A drive cog 41 is fixed to an opposite end of the intermediate shaft 35 and engages a flexible rack or belt 43. Drive cog 41 is provided at or adjacent to one end of the channel 30, and the flexible belt 43 is attached to the proximal end 42 of the inner arm member 22 received within the outer arm member 24.

In order that the flexible belt 43 is kept flat when providing a pushing force, the housing 18 is provided with a wall 44 which closely passes by the perimeter of the drive cog 41, thus defining a narrow channel 46 along which the belt 43 can slide. The narrow channel 46 extends on either side of the drive cog 41, on one side extending around the motor 32 allowing the flexible belt 43 to extend about the motor 32 in the fully retracted position, and on the other side along the channel 30. An arcuate tongue or guide element 48 extends from adjacent to the guide cog 41 and into the inner and outer arm members 22, 24, again preventing or limiting any folding or rucking up of the flexible belt 43 during a pushing action. The guide element 48 is fixed to the housing at an end adjacent to the drive cog 41 by a pin 49. The other end is free allowing the telescopic arm 14 to slide over it. The flexible belt 43 includes teeth or projections 50 on one face which are locatable between adjacent teeth 52 of the drive cog 41.

The motor 32 of the drive unit 20 supplies a driving torque to the drive cog 41 via a planetary gearbox (not shown) attached to the motor 32 and a clutch 40 (partly hidden) provided on the intermediate shaft 35. The clutch 40 has a slip mechanism which prevents the transmission of torque through the clutch 40 if a predetermined torque is exceeded. Consequently, if an obstruction is met by the telescopic arm 14, the clutch slips preventing injury or damage.

By providing two arcuate arm members 22, 24, a distal end 28 of the telescopic arm 14 is extendable and retractable through 80 degrees or more, preferably at least 100 degrees to as much as 110 degrees. However, since the telescopic arm 14 moves only in one plane, the telescopic titling device is provided with a rotation unit 56 which allows rotation of the telescopic arm 14 through at least 180 degrees about an axis of rotation R. As a consequence, the telescopic arm 14 can also move transversely. In particular, the telescopic arm 14 is movable along a second arcuate path 58 which extends at right angles to the first said arcuate path 16.

The housing 18 of the telescopic tilting device 12 includes a rotation bracket 60 which projects substantially in parallel with the output shaft 34 of the motor 32. The rotation bracket 60 is coupled to a driven shaft 62 which extends into a housing 64 of the rotation unit 56. At the other end of the driven shaft 62, a first bevel gear 66 is provided which is engaged with a second bevel gear 68 which meshes at right angles. The second bevel gear 68 is attached to an end of an output shaft 70 of a second electric motor 72, also housed in the housing 64 of the rotation unit 56.

The axis of rotation R is offset from but parallel to the plane in which the first arcuate path 16 of the telescopic arm 14 lies. However, in a modification, it is quite feasible that the axis of rotation R could coincide with the plane in which the arcuate path 16 lies. For example, the rotation bracket or simply a mounting point for rotation can be provided at the rear of the housing 18, thus being aligned with the first arcuate path 16.

The telescopic tilting device 12 also includes a carriage 79 for mounting a, typically detachable, rectilinear member (not shown) which is movable along a rectilinear path P independently of the telescopic arm 14. The carriage 79 is movable from a position which is adjacent to the distal end 28 of the inner arm member 22 of the telescopic arm 14 to a position which is remote therefrom. The carriage 79, and preferably also the rectilinear member, forms part of a zoom unit 78, which is typically demountable from the inner arm member 22.

The zoom unit 78 includes an elongate housing 80 on which the carriage 79 moves or slides. The housing 80 is provided with a motor-driven continuous belt drive mechanism 82. The rectilinear member 74 is connected via the carriage 79, typically in a releasable manner via a clip or clamp with thumb screw 84, to the belt 86 of the belt drive mechanism 82 at one point on a rectilinear track 88, and thus moves in the direction that the belt 86 is driven. Movement of the rectilinear member 74 is controllable independently of movement of the telescopic arm 14.

The rectilinear member can itself be an optical device, or can be a support for an optical device or other device.

A longitudinal axis of the rectilinear path P along which the rectilinear member moves intersects with the axis of rotation R of the telescopic arm 14. Due to the arcuate shape of the telescopic arm 14, tilting movement of the zoom unit 78 occurs about a single stationary point of intersection I of the two axes of the paths P and R. In other words, three distinct movements, being rectilinear movement, tilting or pivoting movement, and rotational movement are all achievable independently or separately without changing the point of intersection I between the rectilinear path P and the axis of rotation R. These three moments are known as zoom, tilt and pan.

Furthermore, the rectilinear path P also extends in parallel with the plane in which the first said arcuate path 16 of the telescopic arm 14 lies. As above, however, it is feasible that the rectilinear path P can be positioned to coincide with the plane of the telescopic arm 14.

To enable independent movement of the rectilinear member 74, the zoom unit 78 is conveniently provided with a releasable push-fit electrical connector 90 which mates with an electrical connector provided on the telescopic arm 14. This latter electrical connector is connected via a wiring harness 92 to a controller, for example, control circuitry (not shown), which interfaces with the user. The wiring harness is preferably internally provided within the device to enable simple and convenient electrical connection and disconnection of the multiple drive units. The control circuitry thus controls the telescopic arm, the rotation unit and the zoom unit.

Optionally, the electrical connectors may be formed as a part of the mechanical connection between the zoom unit 78 and the telescopic arm 14 such that when the two parts are mechanically joined together, they are also electrically connected.

The main benefit of the device described above is the two-part arcuate telescopic arm which allows steady and accurate tilting of any device attached thereto.

Although particularly applicable to endoscopes, and derivatives, such as borescopes and fiberscopes, the telescopic tilting device can be utilized in any application requiring steady and repeatable arcuate movement.

Although a two-part telescopic arm is suggested, only one arcuate arm member could be provided which telescopes into and out of the device housing.

Although two arm members are described above, three or more arm members are feasible.

The flexible belt drive allows a small number of mechanical parts to be used, increasing the robustness and longevity of the telescopic tilting device. The belt itself has a long life expectancy, and requires no maintenance, unlike a mechanism which utilizes mechanical joints.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. An endoscope device, comprising:
   a replaceable endoscope probe;
   a carriage for holding the endoscope probe and defining a first axis;
   a zoom unit arranged to move the carriage linearly along a rectilinear path so as to move the probe along the first axis;
   a tilting unit arranged to tilt the zoom unit so as to tilt the first axis and the probe about a point, the tilting unit comprising a housing with a drive member, a first arcuate member and a second arcuate member therein the first arcuate member being capable of sliding in and out from only one end of the housing, the second arcuate member being capable of sliding in and out from only one end of the first arcuate member, wherein the zoom unit is connected to one distal end of the second arcuate member remote from the first arcuate member when the second arcuate member slides out of the first arcuate member; and
   a rotation unit arranged to rotate the first axis and the probe about a second axis which passes through the point.

2. The device of claim 1, wherein the first arcuate member of the tilting unit has a U-shaped cross section.

3. The device of claim 2, wherein the drive member comprises a flexible belt extending through the first arcuate member and connected to the other distal end of the second arcuate member for moving the second arcuate member.

4. The device of claim 3, wherein the housing of the tilting unit forms a guide element within the first arcuate member to prevent folding of the flexible belt.

5. The device of claim 4, wherein the second arcuate member has a U-shaped cross section.

6. The device of claim 1, wherein the second arcuate member comprises a stop adjacent to said one distal end.

7. The device of claim 1, wherein the housing of the tilting unit comprises a rotation bracket formed at an outer surface of the housing, the rotation unit comprises a driven shaft coupled to the rotation bracket of the housing to rotate the tilting unit about the driven shaft.

8. A probing device for articulately moving a probe, comprising:
   a carriage for holding the probe;
   a zoom unit coupled to said carriage and configured to move the probe with said carriage along a rectilinear path;
   a tilting unit configured to tilt said zoom unit along a first arcuate path coplanar with the rectilinear path, said tilting unit comprising a housing having an opening, a drive member in said housing, a first arcuate member having a first end inside said housing and a second end capable of sliding in and out said housing through the opening, and a second arcuate member slidable in said first arcuate member and having a first end coupled to said drive member and a second end coupled to said zoom unit, the second end of said second arcuate member being capable of sliding between a first position adjacent to the second end of said first arcuate member and a second position remote from the second end of said first arcuate member; and
   a rotation unit coupled to said tiling unit and configured to rotate said tilting unit along a second arcuate path perpendicular to the first arcuate path.

9. The probing device of claim 8, wherein said first arcuate member of said tilting unit has a U-shaped cross section encompassing the first end of said second arcuate member.

10. The probing device of claim 9, wherein said drive member comprises a flexible belt extending through said first arcuate member and connected to the first end of said second arcuate member.

11. The probing device of claim 10, wherein said housing of said tilting unit forms a guide element within the first arcuate member to prevent folding of the flexible belt.

12. The probing device of claim 11, wherein said second arcuate member has a U-shaped cross section.

13. The probing device of claim 8, wherein said second arcuate member comprises a stop adjacent to the second end.

14. The probing device of claim 8, wherein the housing of the tilting unit comprises a rotation bracket formed at an outer surface of the housing, the rotation unit comprises a driven shaft coupled to the rotation bracket of the housing to rotate the tilting unit about the driven shaft.

15. The probing device of claim 8, wherein said rotation unit rotates said tilting unit about a rotation axis which intersects said rectilinear path at a point, about which the tilting unit tilts said zoom unit.

* * * * *